(12) United States Patent
Souder

(10) Patent No.: US 12,545,176 B1
(45) Date of Patent: Feb. 10, 2026

(54) TAILLIGHT ASSEMBLY

(71) Applicant: Steven B. Souder, Naples, FL (US)

(72) Inventor: Steven B. Souder, Naples, FL (US)

( * ) Notice: Subject to any disclaimer, the term of this patent is extended or adjusted under 35 U.S.C. 154(b) by 0 days.

(21) Appl. No.: 18/824,994

(22) Filed: Sep. 5, 2024

(51) Int. Cl.
*B60Q 1/26* (2006.01)
*B60Q 1/22* (2006.01)
*B60Q 1/44* (2006.01)

(52) U.S. Cl.
CPC ............. *B60Q 1/2642* (2013.01); *B60Q 1/22* (2013.01); *B60Q 1/44* (2013.01); *B60Q 2400/00* (2013.01)

(58) Field of Classification Search
CPC ........... B60Q 1/2642; B60Q 1/22; B60Q 1/44
See application file for complete search history.

(56) References Cited

U.S. PATENT DOCUMENTS

| | | | | |
|---|---|---|---|---|
| 4,692,845 | A * | 9/1987 | Widhalm | B60Q 3/30 362/523 |
| 6,786,623 | B2 * | 9/2004 | Snyder | B60Q 3/30 362/543 |
| 10,787,118 | B2 * | 9/2020 | Augusty | B62D 33/03 |

OTHER PUBLICATIONS

"C10CrewCab", 1960-1966 C-10 Tail Light fuel filler kit model, Feb. 4, 2023 via waybackmachine, attached, https://c10crewcab.com/tail-light-fuel-filler (Year: 2023).*
Waybackmachine to establish date (Year: 2023).*

* cited by examiner

*Primary Examiner* — Matthew J. Peerce
(74) *Attorney, Agent, or Firm* — LOEFFLER IP GROUP, P.A.; Bryan L. Loeffler, Esq.

(57) ABSTRACT

A rotatable taillight assembly that allows the taillight to be repositioned to make hazard lights more visible to approaching traffic and/or repositioned to provide light to a rear cargo area or tailgate.

3 Claims, 5 Drawing Sheets

TAILLIGHT ASSEMBLY

FIELD OF THE INVENTION

The present invention generally relates to motor vehicles and, more particularly, pivoting taillights having that may to be repositioned for higher visibility when a vehicle is stopped and/or to illuminate the rear cargo area of the vehicle.

BACKGROUND OF THE INVENTION

Motor vehicle taillight assemblies are well known for providing brake lights, flashing hazard lights, and a clear reverse light. It is important for taillight assemblies to be visible to other drivers especially during emergencies, wherein a driver may be stopped on the side of a busy road and traffic is approaching from the rear.

Another problem that arises for drivers is a lack of light in rear cargo areas or truck beds, which makes it difficult to see in the dark.

Therefore, a need exists for a taillight assembly that allows the taillights to be repositioned for higher visibility in hazard situations and/or to illuminate the cargo area of a vehicle.

SUMMARY OF THE INVENTION

The primary object of the present invention is to provide a taillight assembly that increases the visibility of hazard lights on a stopped vehicle.

An additional object of the present invention is to provide a taillight assembly that may be repositioned to illuminate a tailgate and/or rear cargo area of a vehicle.

The present invention achieves the above and other objects by providing a taillight assembly for a vehicle wherein the structure of the assembly includes a housing, and light sources for indicating braking, hazards, and reverse. The housing is pivotally coupled to the rear fender of the vehicle, thereby allowing a user to move the housing between a stowed position and an extended position.

The housing is normally placed in the stowed position for normal use while driving. Alternatively, the housing may be placed in an extended position while the vehicle is parked to make the brake lights and hazard lights more visible to approaching vehicles and/or to shine white light onto the tailgate and/or into the cargo area of the vehicle at nighttime.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1A:
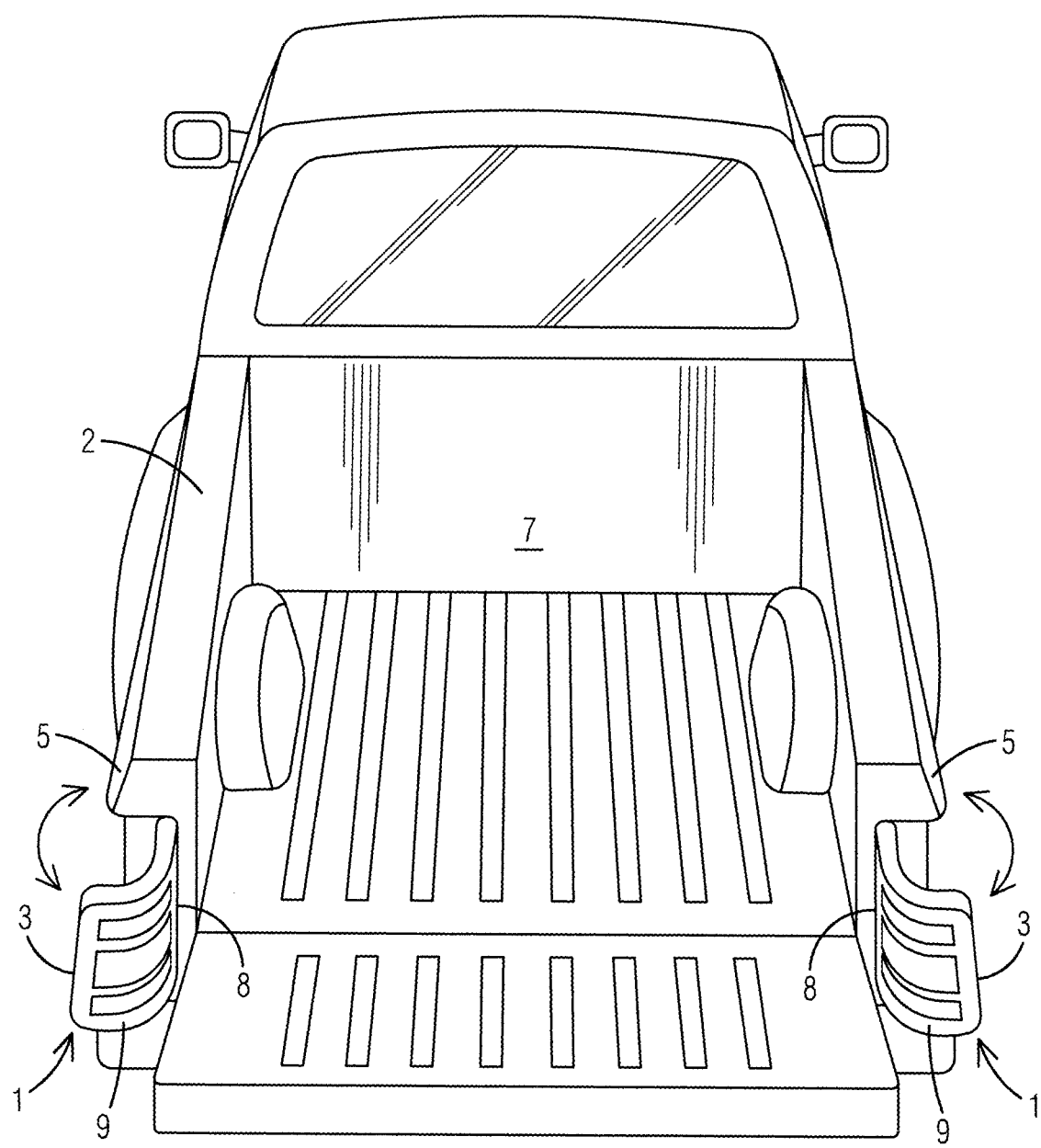
FIG. 1A is a rear perspective view of a vehicle having a taillight assembly of the present invention in a partially extended position to increase the visibility of the taillight assembly to approaching vehicles.
Figure 1B:
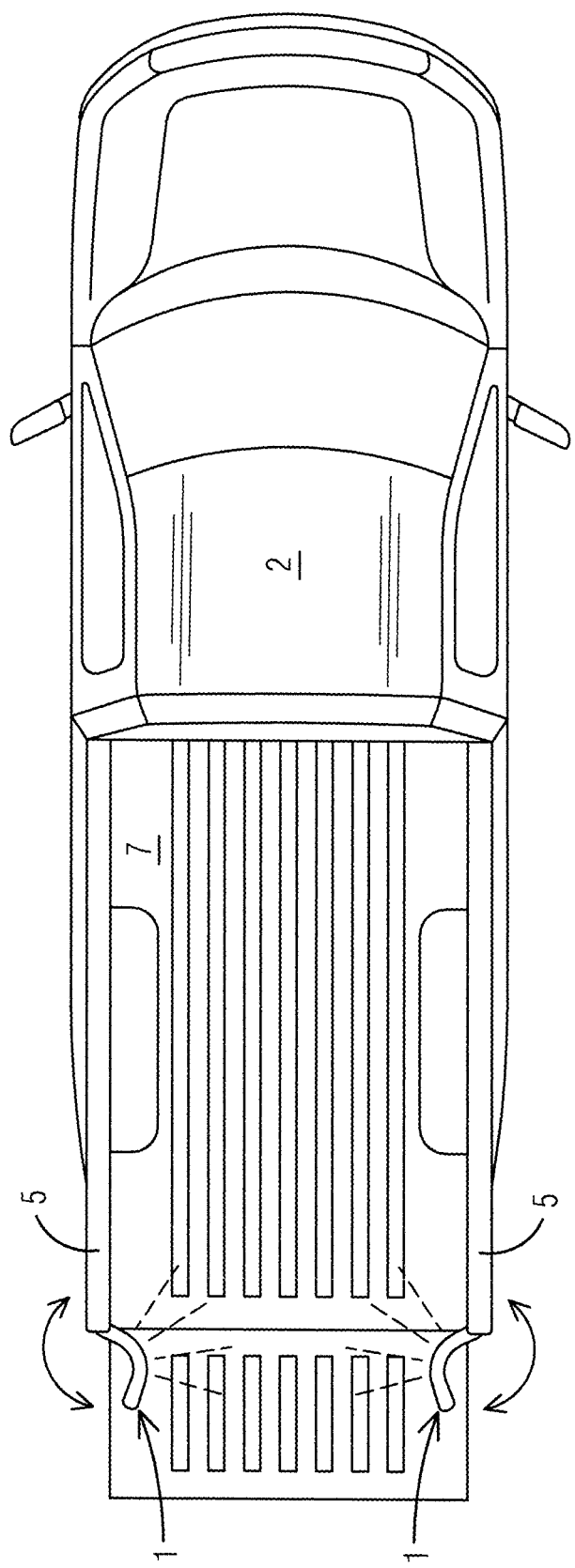
FIG. 1B is a top view of a vehicle having a taillight assembly of the present invention in a partially extended position to increase the visibility of the taillight assembly to approaching vehicles.
Figure 2A:
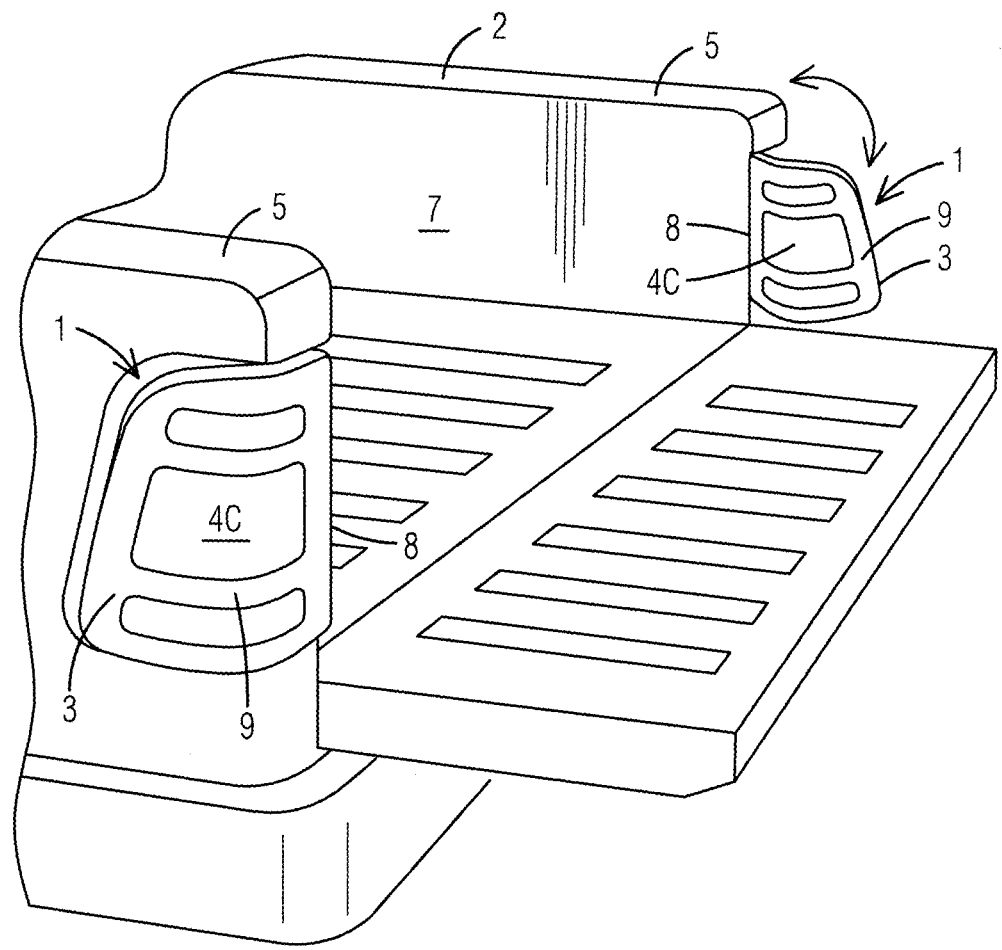
FIG. 2A is a top view of a vehicle having a taillight assembly of the present invention in a fully extended position to provide light to a rear cargo area of a vehicle.
Figure 2B:
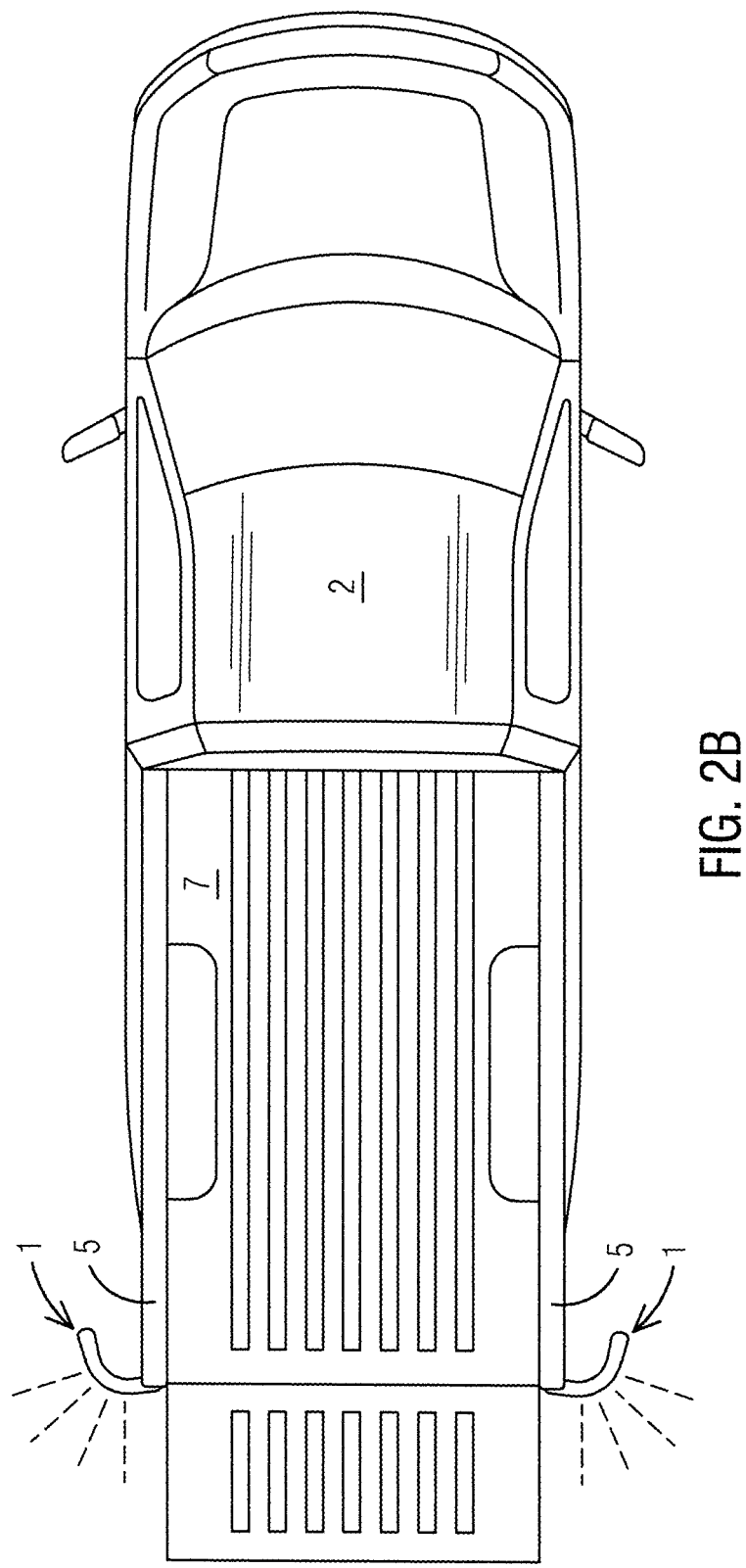
FIG. 2B is a side perspective view of a vehicle having a taillight assembly of the present invention in a fully extended position to provide light to a rear cargo area of a vehicle.

For purposes of describing the preferred embodiment, the terminology used in reference to the numbered accessories in the drawings is as follows:
1. taillight assembly, generally
2. vehicle
3. housing
4. light source
4A. brake light
4B. hazard light
4C. reverse light
5. rear fender
6. frame of taillight assembly
7. cargo area
8. rear surface of housing
9. side surface of housing
10. pivot point
10A. top pivot point
10B. bottom pivot point
11. top rear corner of housing
12. bottom rear corner of housing
13. inside edge of housing
14. hinge With general reference to FIG. 1a, a vehicle 2 having a taillight assembly 1 of the present invention in a partially extended position to increase the visibility of the tailgate assembly 1 and the vehicle 2 is illustrated. The structure of the taillight assembly 1 includes a housing 3, and light sources 4 including at least one brake light 4A, at least one hazard light 4B, and at least one reverse light 4C. The housing 3 is pivotally coupled to the rear fender 5 of the vehicle 2 and or to a frame 6 mounted to the rear fender 5, thereby allowing a user to swing the housing 3 from a stowed position inward toward a cargo area 7 of the vehicle 2, thereby allowing the light sources 4 to be directed toward the rear of the vehicle or toward the cargo area 7 of the vehicle 2, as illustrated in FIG. 2.

The housing 3 may be locked in a stowed position for normal use while driving wherein a rear surface 8 of the taillight assembly 1 is facing rearwardly and a side surface 9 of the taillight assembly 1 being flush with the rear fender 5 of the vehicle 2.

Figure 3:
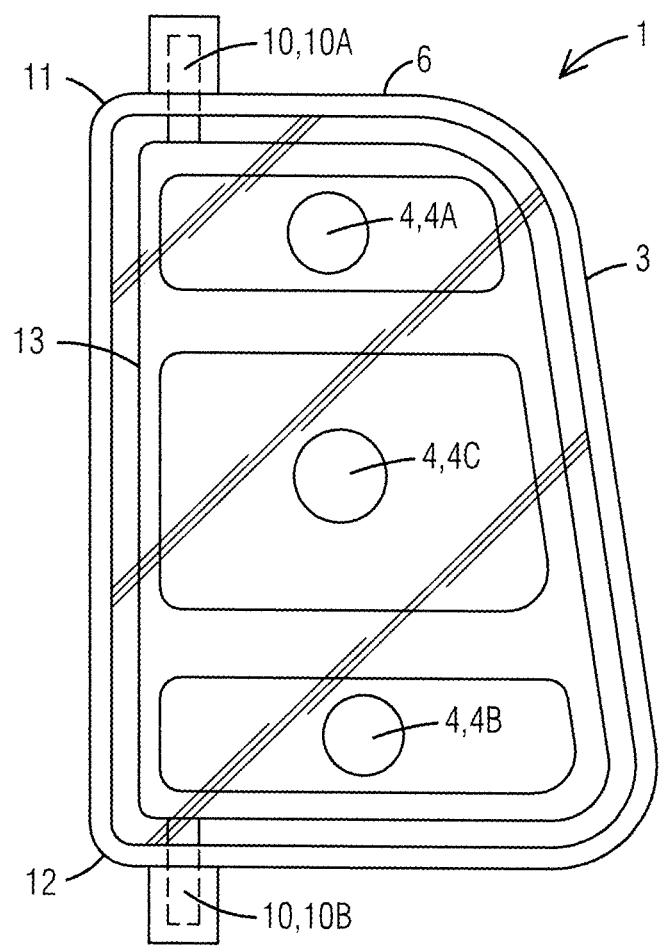
FIG. 3 is a front view of a rear taillight assembly of the present invention having pivot points.
Figure 4:
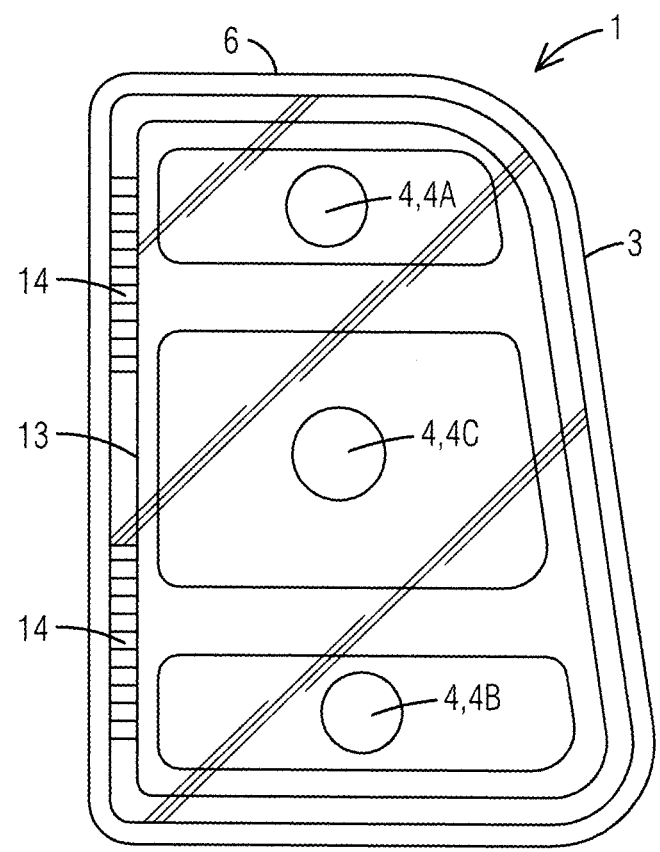
FIG. 4 is a front view of a rear taillight assembly of the present invention having pivot points.

As illustrated in FIG. 3, pivot points 10 may be located on a top rear corner 11 and bottom rear corner 12 of the housing 3 to allow the housing 3 to be rotated from a stowed position into and into a partially extended position or fully extended position. As As illustrated in FIG. 4, an inside edge 13 of the housing 3 may be attached via one or more hinges 14 to make the housing 3 rotatable in relation to the vehicle 2.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A taillight assembly for a vehicle having a rear cargo area, said taillight assembly comprising:
   a housing having a substantially L-shaped profile rear surface and a side surface wherein said rear surface faces rearwardly from the vehicle and said side surface is flush with a rear side surface of the vehicle when the housing is in a stowed position on the vehicle;
   said housing containing a light source for indicating braking, a light source for indicating a hazard, and a light source for indicating reverse;
   said housing being pivotally coupled to a frame for attachment to the rear of the vehicle; and
   said housing being pivotally coupled to the frame on an inside edge of the housing to allow the housing to be rotated from the stowed position into a partially open position wherein the rear surface and the side surface of the housing are both facing in a rearward direction or into a fully open position wherein the rear surface and the side surface of the housing are both facing toward a front of the vehicle to illuminate the rear cargo area.

2. The taillight assembly of claim 1 wherein:
   said housing is coupled to said frame via at least one pivot point.

3. The taillight assembly of claim 1 wherein:
   said housing is coupled to said frame via at least one hinge.

* * * * *